United States Patent
Niino et al.

(10) Patent No.: US 9,731,719 B2
(45) Date of Patent: Aug. 15, 2017

(54) VEHICLE CONTROL APPARATUS AND VEHICLE CONTROL PROGRAM

(71) Applicant: DENSO CORPORATION, Kariya, Aichi-pref. (JP)

(72) Inventors: Hiroaki Niino, Toyota (JP); Shotaro Fukuda, Obu (JP); Takahiro Narita, Nagoya (JP); Masao Oooka, Gamagori (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 38 days.

(21) Appl. No.: 14/727,919

(22) Filed: Jun. 2, 2015

(65) Prior Publication Data
US 2015/0353087 A1 Dec. 10, 2015

(30) Foreign Application Priority Data
Jun. 6, 2014 (JP) .................................. 2014-117868

(51) Int. Cl.
*G05D 1/00* (2006.01)
*B60T 7/12* (2006.01)
(Continued)

(52) U.S. Cl.
CPC ...... *B60W 30/16* (2013.01); *B60W 30/18163* (2013.01); *B60W 50/14* (2013.01);
(Continued)

(58) Field of Classification Search
CPC ........... B60W 30/16; B60W 30/18163; B60W 50/14; B60W 2520/10; B60W 2550/402;
(Continued)

(56) References Cited

U.S. PATENT DOCUMENTS 4,477,184 A * 10/1984 Endo ..................... G01S 17/936
180/169
5,546,311 A * 8/1996 Sekine .................. G08G 1/052
340/902
(Continued)

FOREIGN PATENT DOCUMENTS

DE 10 2008 012 644 9/2009
JP H05-159198 A 6/1993
(Continued)

OTHER PUBLICATIONS

Office Action dated Feb. 5, 2016 in corresponding German Application No. 102015210194.0 with English translation.

*Primary Examiner* — Mary Cheung
(74) *Attorney, Agent, or Firm* — Harness, Dickey & Pierce, P.L.C.

(57) ABSTRACT

A vehicle control apparatus is mounted to an own vehicle and controls the own vehicle such that an inter-vehicle distance between a preceding vehicle and the own vehicle becomes a reference distance. The vehicle control apparatus acquires passing suitability information indicating whether or not the own vehicle is able to pass the preceding vehicle. When the own vehicle is not able to pass the preceding vehicle, the vehicle control apparatus corrects the inter-vehicle distance by adding a correction distance to a reference distance.

16 Claims, 5 Drawing Sheets

(51) Int. Cl.
*B60W 30/08* (2012.01)
*B60W 30/16* (2012.01)
*B60W 50/14* (2012.01)
*B60W 30/18* (2012.01)

(52) U.S. Cl.
CPC .... *B60K 2310/264* (2013.01); *B60W 2520/10* (2013.01); *B60W 2550/30* (2013.01); *B60W 2550/302* (2013.01); *B60W 2550/306* (2013.01); *B60W 2550/308* (2013.01); *B60W 2550/402* (2013.01); *B60W 2550/408* (2013.01); *B60W 2720/10* (2013.01); *B60W 2720/106* (2013.01); *B60W 2750/308* (2013.01)

(58) Field of Classification Search
CPC ....... B60W 2550/30; B60W 2550/308; B60W 2550/306; B60W 2550/302; B60W 2750/308; B60W 2750/408; B60W 2720/10; B60W 2720/106; B60W 2310/264
See application file for complete search history.

(56) References Cited

U.S. PATENT DOCUMENTS

| | | | | |
|---|---|---|---|---|
| 5,805,103 A | * | 9/1998 | Doi | B60K 31/0008 340/435 |
| 6,119,068 A | * | 9/2000 | Kannonji | B60Q 9/008 180/271 |
| 6,339,740 B1 | * | 1/2002 | Seto | B60K 31/047 340/904 |
| 6,353,788 B1 | * | 3/2002 | Baker | B60K 31/0008 340/435 |
| 6,418,370 B1 | * | 7/2002 | Isogai | B60K 31/0008 180/170 |
| 2002/0099491 A1 | * | 7/2002 | Akabori | B60K 31/0008 701/96 |
| 2004/0140143 A1 | * | 7/2004 | Saeki | B60K 31/0008 180/271 |
| 2006/0100769 A1 | * | 5/2006 | Arai | B60W 30/16 701/96 |
| 2006/0210113 A1 | * | 9/2006 | Fujioka | G01S 13/86 382/104 |
| 2009/0164082 A1 | * | 6/2009 | Kobayashi | B60K 31/0008 701/94 |
| 2009/0182505 A1 | * | 7/2009 | Ikeda | G01S 13/931 701/301 |
| 2010/0057321 A1 | * | 3/2010 | Randler | B60W 30/16 701/96 |

FOREIGN PATENT DOCUMENTS

| | | |
|---|---|---|
| JP | 06-8747 | 1/1994 |
| JP | H06-247245 A | 9/1994 |
| JP | H11-213300 A | 8/1999 |
| JP | 2009-248892 A | 10/2009 |

* cited by examiner

VEHICLE CONTROL APPARATUS AND VEHICLE CONTROL PROGRAM

CROSS-REFERENCE TO RELATED APPLICATION

This application is based on and claims the benefit of priority from Japanese Patent Application No. 2014-117868, filed Jun. 6, 2014, the disclosure of which is incorporated herein in its entirety by reference.

BACKGROUND

Technical Field

The present disclosure relates to a vehicle control apparatus that controls an own vehicle such that an inter-vehicle distance between a preceding vehicle and the own vehicle becomes a reference distance, and a vehicle control program.

Related Art

As the above-described vehicle control apparatus, an apparatus is known that changes a target vehicle speed to a higher value when passing is performed (refer to, for example, JP-A-H06-008747).

In the above-described vehicle control apparatus, in a state in which passing cannot be performed, the own vehicle catches up to the preceding vehicle. Therefore, when the own vehicle attempts passing when the state in which passing cannot be performed changes to a state in which passing can be performed, the inter-vehicle distance is already short. Therefore, the own vehicle is required to accelerate after entering the passing lane. As a result, a problem occurs in that passing cannot be performed smoothly.

SUMMARY

It is thus desired to enable smooth passing in a vehicle control apparatus that controls an own vehicle such that an inter-vehicle distance between a preceding vehicle and the own vehicle becomes a reference distance.

An exemplary embodiment provides a vehicle control apparatus that is mounted to an own vehicle and controls the own vehicle such that an inter-vehicle distance between a preceding vehicle and the own vehicle becomes a reference distance. The vehicle control apparatus includes passing suitability (possibility) information acquisition means and inter-vehicle distance correction means. The passing suitability information acquisition means acquires passing suitability information indicating whether or not the own vehicle is able to pass a preceding vehicle. When the own vehicle is not able to pass the preceding vehicle, the inter-vehicle distance correction means corrects the inter-vehicle distance by adding a correction distance to a reference distance.

In the vehicle control apparatus such as this, when the own vehicle is not able to pass the preceding vehicle, an inter-vehicle distance for acceleration can be secured by an amount equivalent to the correction distance. Therefore, passing can be smoothly performed when passing becomes possible.

The present disclosure may be actualized as a program. In other words, the present disclosure may be a vehicle control program that actualizes each means configuring the vehicle control apparatus by a computer. In addition, the expression according to each claim may be arbitrarily combined if at all possible. In this case, some configurations may be omitted to an extent enabling the object of the disclosure to be achieved.

DESCRIPTION OF EMBODIMENTS

An embodiment of the present disclosure will hereinafter be described with reference to the drawings.

[Configuration]

A vehicle control apparatus 1 to which the present disclosure is applied is, for example, mounted in a vehicle (own vehicle) such as a passenger car. The vehicle control apparatus 1 controls the own vehicle such that the own vehicle travels with a preset speed as an upper limit, and an inter-vehicle distance between the own vehicle and a preceding vehicle that is travelling ahead of the own vehicle in the same lane as the own vehicle is a reference distance or more.

In particular, the vehicle control apparatus 1 according to the present embodiment provides a function for setting a longer inter-vehicle distance when the own vehicle is not able to pass the preceding vehicle, thereby facilitating acceleration that is performed when passing is performed in the future. The vehicle control apparatus 1 also provides a function for accelerating the own vehicle and facilitating passing when a state in which passing cannot be performed transitions to a state in which passing becomes possible.

Figure 1:
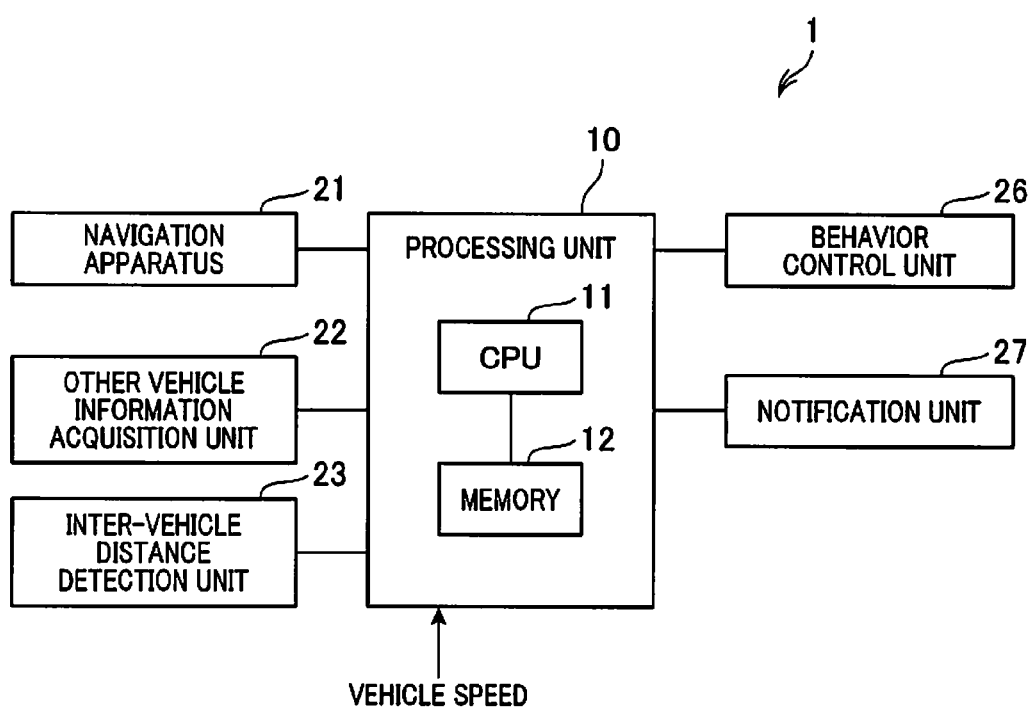
FIG. 1 is a block diagram showing an overall configuration of a vehicle control apparatus to which the present disclosure is applied.

As shown in FIG. 1, the vehicle control apparatus 1 includes a processing unit 10, a navigation apparatus 21, an other vehicle information acquisition unit 22, an inter-vehicle distance detection unit 23, a behavior control unit 26, and a notification unit 27. The navigation apparatus 21 includes map information and a current position detection function, and provides a function for guiding the own vehicle to a destination based on the map information.

In addition, in response to a request from the processing unit 10, the navigation apparatus 21 sends, to the processing unit 10, various information (part of the map information) such as whether or not passing is possible at the position of the own vehicle on the road on which the own vehicle is travelling, the distance to a passing possible area in which passing is possible on the road on which the own vehicle is travelling, and the length of the passing possible area.

The other vehicle information acquisition unit 22 acquires information obtained from another vehicle positioned near the own vehicle, via vehicle-to-vehicle communication and the like. The information obtained from another vehicle includes the position of the other vehicle that is transmitting the information, the travelling speed of the other vehicle, and the like. The other vehicle information acquisition unit 22 sends the information obtained from the other vehicle to the processing unit 10.

The inter-vehicle distance detection unit 23 provides a function for measuring the inter-vehicle distance between the own vehicle and the preceding vehicle that is positioned directly ahead of the own vehicle, as well as the relative speed to the preceding vehicle. The inter-vehicle distance detection unit 23 is merely required to be, for example, configured to perform image processing on images captured by a stereo camera, or configured as a radar or the like. The inter-vehicle distance detection unit 23 transmits, to the processing unit 10, information on the inter-vehicle distance to the preceding vehicle.

The behavior control unit 26 is, for example, configured as an actuator that controls the throttle opening degree and braking of the own vehicle. The behavior control unit 26 controls the travelling speed and the inter-vehicle distance of the own vehicle in compliance with commands from the processing unit 10 by changing, as appropriate, the throttle opening degree and braking based on the commands from the processing unit 10. In addition, the behavior control unit 26 also includes an actuator that controls the steering angle of the own vehicle based on commands from the processing unit 10.

The notification unit 27 is configured as a speaker or a display that gives notification to the driver of the own vehicle based on commands from the processing unit 10. The form of notification given by the notification unit 27 can be arbitrary.

The processing unit 10 is configured as a computer that includes a central processing unit (CPU) 11 and a memory 12, such as a read-only memory (RAM) or a random access memory (ROM). The CPU 11 performs various processes based on programs (including a vehicle control program) stored in the memory 12.

The processing unit 10 also performs adaptive cruise control (ACC) to make the own vehicle travel at a speed that is as close as possible to a target vehicle speed, while performing control to maintain the inter-vehicle distance to the preceding vehicle at a distance equal to or greater than a set target inter-vehicle distance. In addition to ACC, the processing unit 10 also performs automatic steering by which steering is also automatically performed.

[Processes]

Figure 2:
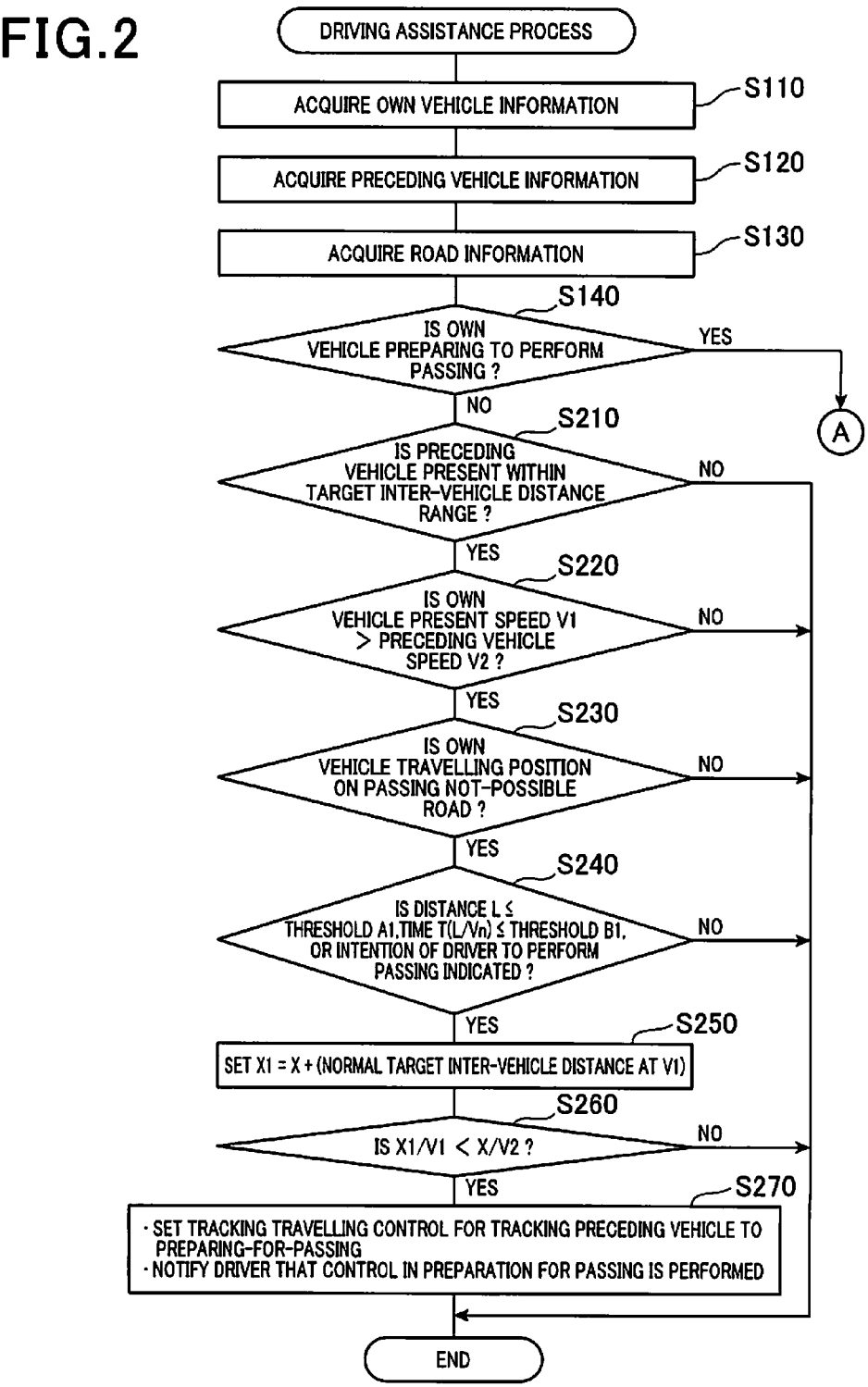
FIG. 2 is a flowchart (1) showing a driving assistance process performed by a processing unit (CPU) of the vehicle control apparatus.

In the vehicle control apparatus 1 configured as described above, the processing unit 10 performs a driving assistance process shown in FIG. 2. In the driving assistance process, basically, the processing unit 10 acquires passing possible/not-possible information (hereinafter referred to as passing suitability information or passing possibility information) that indicates whether or not the own vehicle is able to pass the preceding vehicle while automatic steering is in operation, and when determined that the own vehicle is not able to pass the preceding vehicle, adds a correction distance to the inter-vehicle distance for normal operation.

In addition, the driving assistance process is, for example, started when the inter-vehicle distance detection unit 23 detects a preceding vehicle while automatic steering is in operation, and repeatedly performed as long as the preceding vehicle is detected.

As shown in FIG. 2, in the driving assistance process, the processing unit 10 first acquires the own vehicle information (step S110). In this process, the processing unit 10 acquires information on the travelling speed of the own vehicle obtained by a vehicle speed sensor (not shown) and travelling position information (current position information) of the own vehicle obtained from the navigation apparatus 21. In addition, as the own vehicle information, the processing unit 10 also acquires a preset speed (own vehicle preset speed V1) for automatic driving of the own vehicle.

Next, the processing unit 10 acquires preceding vehicle information (step S120). In this process, as the preceding vehicle information, the processing unit 10 acquires the position and travelling speed (preceding vehicle speed V2) of the preceding vehicle obtained from the other vehicle information acquisition unit 22 and the inter-vehicle distance detection unit 23.

Next, the processing unit 10 acquires road information (step S130). In this process, as the road information, the processing unit 10 acquires from the navigation apparatus 12 information on whether or not passing is possible at the position of the own vehicle on the road on which the own vehicle is travelling, the distance to the passing possible area in which passing is possible, and the length of the passing possible area.

Next, the processing unit 10 determines whether or not the own vehicle is preparing to perform passing (step S140). Whether or not the own vehicle is preparing to perform passing is determined based on a tracking control state (flag) recorded in the memory 12. The tracking control state is used to identify whether or not the own vehicle is preparing to perform. The own vehicle is not preparing to perform passing until the process at step S270, described hereafter, is performed, and is preparing to perform passing when the process at step S270 is performed. The state in which the own vehicle is preparing to perform passing is continued until passing is performed (step S360 is performed) or the preparation for passing is cancelled (step S370 is performed). The own vehicle is no longer preparing to perform passing when either of the processes are performed.

When determined that the own vehicle is preparing to perform passing (YES at step S140), the processing unit 10 proceeds to the process at step S310 (see FIG. 3), described hereafter. In addition, when determined that the own vehicle is not preparing to perform passing (NO at step S140), the processing unit 10 determines whether or not the preceding vehicle is present within a target inter-vehicle distance range (step S210).

Figure 4:
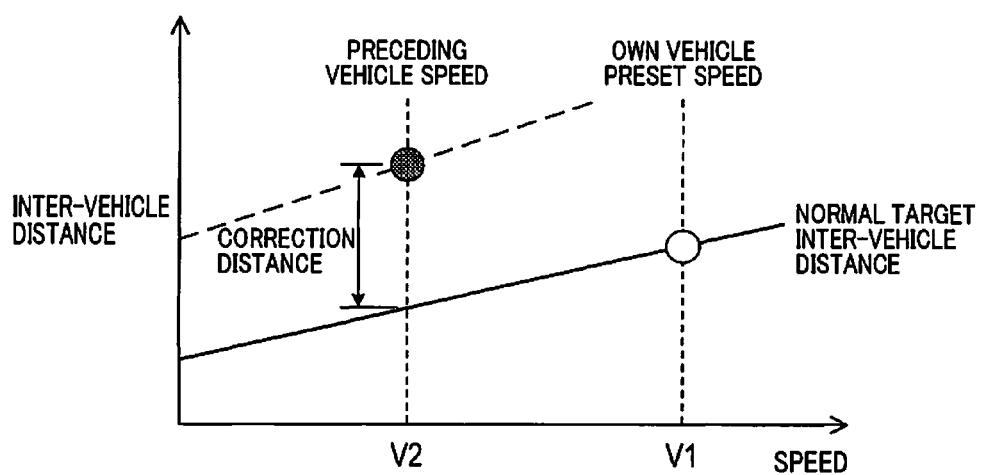
FIG. 4 is a graph showing a relationship between speed and inter-vehicle distance.

Here, the target inter-vehicle distance refers to the normal target inter-vehicle distance shown in FIG. 4. As shown in FIG. 4, the normal target inter-vehicle distance is set in the map so as to increase as the travelling speed of the own vehicle increases. During normal travelling in which the own vehicle does not perform passing or the like, as shown in the broken-line box [A] in FIG. 5, the own vehicle 51 and the preceding vehicle 52 travel so as to maintain the inter-vehicle distance that is the normal target inter-vehicle distance (normal setting) or more.

When determined that the preceding vehicle is not present within the target inter-vehicle distance range (NO at step S210), the processing unit 10 terminates the driving assistance process. When determined that the preceding vehicle is present within the target inter-vehicle distance range (YES at step S210), the processing unit 10 compares the own vehicle preset speed V1 and the preceding vehicle speed V2 (step S220). When determined that the own vehicle preset speed V1 is the preceding vehicle speed V2 or lower (NO at step S220), the processing unit 10 terminates the driving assistance process.

When determined that the own vehicle preset speed V1 is higher than the preceding vehicle speed V2 (YES at step S220), the processing unit 10 determines whether or not the travelling position of the own vehicle is in a passing not-possible area (step S230). In this process, the processing unit 10 makes the determination based on the information regarding whether or not passing is able to be performed, obtained from the navigation apparatus 21.

When determined that the travelling position of the own vehicle is in the passing possible area (NO at step S230), the processing unit 10 terminates the driving assistance process. When determined that the travelling position of the own vehicle is in the passing not-possible area (YES at step S230), the processing unit 10 determines whether or not passing will be performed in the near future (step S240).

In this process, the processing unit 10 compares the distance L from the own vehicle to a zone in which passing becomes possible to a threshold A1 that is set in advance, and also compares time T that is obtained by dividing the distance L by the current travelling speed Vn of the own vehicle to a threshold B1 that is set in advance. In other words, the processing unit 10 compares the distance and time until passing is able to be performed to the thresholds.

In addition, in this process, the processing unit 10 determines whether or not the driver intends to perform passing. The intention of the driver to perform passing can be detected, for example, by the operating state of a mechanical switch operated by the driver being obtained.

When determined that the distance L from the own vehicle to the zone in which passing becomes possible is greater than the threshold A1, the time T until passing becomes possible is greater than the threshold B1, and the intention of the driver to perform passing is not acquired (NO at step S240), the processing unit 10 terminates the driving assistance process. When the distance L from the own vehicle to the zone in which passing becomes possible is the threshold A1 or less, the time T until passing becomes possible is the threshold B1 or less, or the intention of the driver to perform passing is acquired (YES at step S240), the processing unit 10 proceeds to the process at step S250.

In other words, the processing unit 10 adds the normal target inter-vehicle distance at the preset speed V1 of the own vehicle to the distance X of the nearest passing possible zone (the length of the passing possible zone corresponding to the distance L), and sets the obtained value as X1 (step S250). Then, the processing unit 10 determines whether or not passing can be completed within the passing possible zone (step S260).

For example, the processing unit 10 compares a value obtained by dividing the distance X1 by the preset speed V1 of the own vehicle to a value obtained by dividing the distance X by the preceding vehicle speed V2. Then, when the value obtained by dividing the distance X1 by the preset speed V1 of the own vehicle is less than the value obtained by dividing the distance X by the preceding vehicle speed V2, the processing unit 10 determines that passing will be completed within the passing possible zone.

When determined that passing will not be completed within the passing possible zone (NO at step S260), the processing unit 10 terminates the driving assistance process. When determined that passing will be completed within the passing possible zone (YES at step S260), the processing unit 10 sets the state of tracking travelling control in the memory 12 to preparing-for-passing, uses the notification unit 27 to notify the driver that control in preparation for passing will be performed (step S270), and terminates the driving assistance process.

Figure 3:
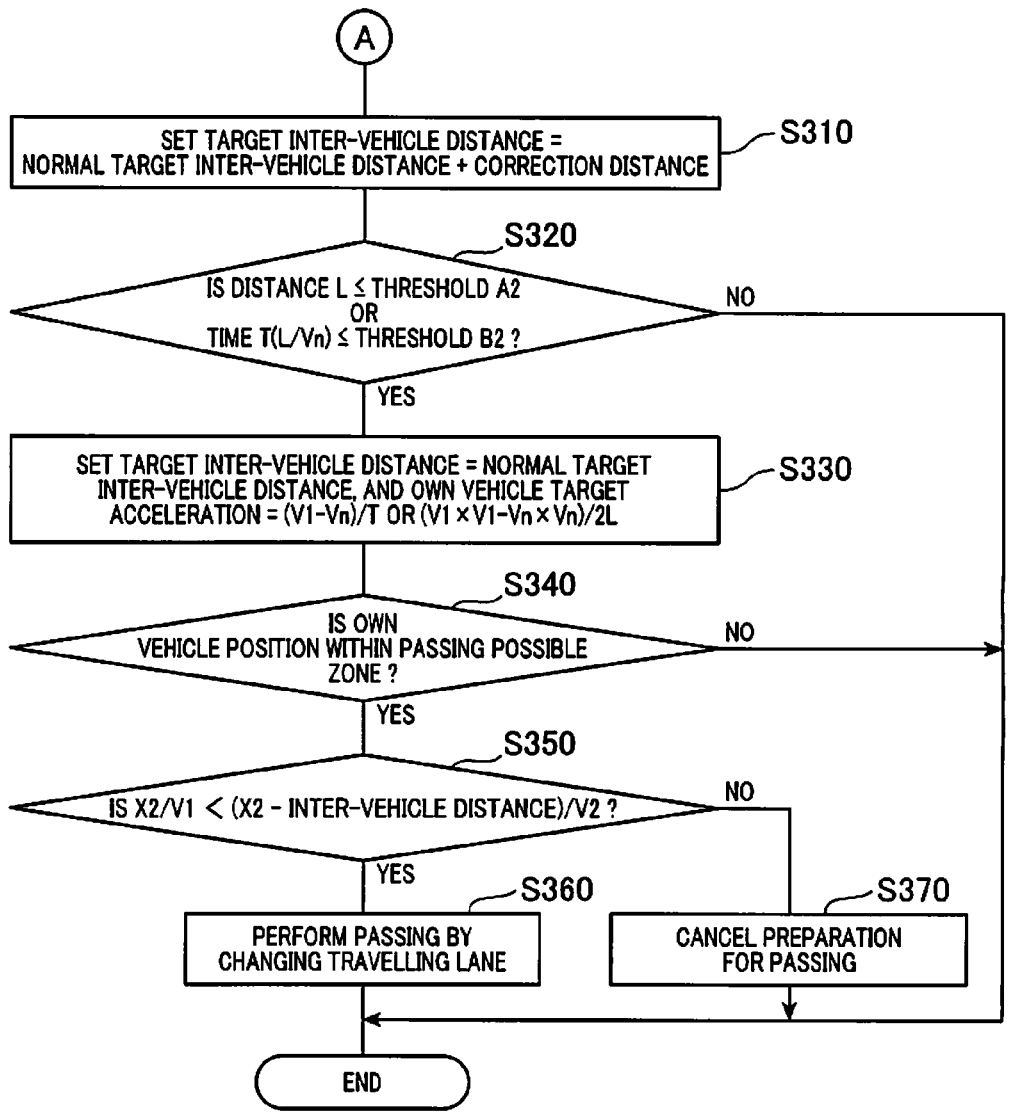
FIG. 3 is a flowchart (2) showing the driving assistance process performed by the CPU.

When determined that the own vehicle is preparing to perform passing in the process at step S140, as shown in FIG. 3, the processing unit 10 performs the processes at step S310 and subsequent steps. First, the processing unit 10 sets the target inter-vehicle distance (step S310). In this process, as shown in FIG. 4, the processing unit 10 sets a value obtained by adding a correction distance to the normal target inter-vehicle distance as the target inter-vehicle distance.

As shown in FIG. 4, the correction distance is set in relation to the preceding vehicle speed V2 and increases as the preceding vehicle speed V2 increases. When the target inter-vehicle distance such as this is set, as shown in the broken-line box [B] in FIG. 5, the inter-vehicle distance is increased by an amount equivalent to the correction distance, compared to the inter-vehicle distance shown in the broken-line box [A].

Next, the processing unit 10 determines whether or not to start acceleration of the own vehicle (step S320). In this process, the processing unit 10 compares the distance L to the zone in which passing becomes possible to a threshold A2 that is set in advance, and compares the time T until passing becomes possible to a threshold B2 that is set in advance. The threshold A2 is set to a value that is less than the threshold A1, and the threshold B2 is set to a value that is less than the threshold B1.

When determined that the distance L to the zone in which passing becomes possible is greater than the threshold A2 and the time T until passing becomes possible is greater than the threshold B2 (NO at step S320), the processing unit 10 terminates the driving assistance process. When determined that the distance L to the zone in which passing becomes possible is the threshold A2 or less, or time T2 until passing becomes possible is the threshold B2 or less (YES at step S320), the processing unit 10 sets the target inter-vehicle distance and an own vehicle target acceleration (step S330).

In this process, regarding the target inter-vehicle distance, the processing unit 10 sets the normal target inter-vehicle distance obtained by subtraction of the correction distance. In addition, the own vehicle target acceleration is the target acceleration for acceleration of the own vehicle. The processing unit 10 may, for example, set the own vehicle target acceleration to a value determined using either of the expressions $(V1-Vn)/T$ and $(V1 \times V1 - Vn \times Vn)/2L$.

Figure 5:
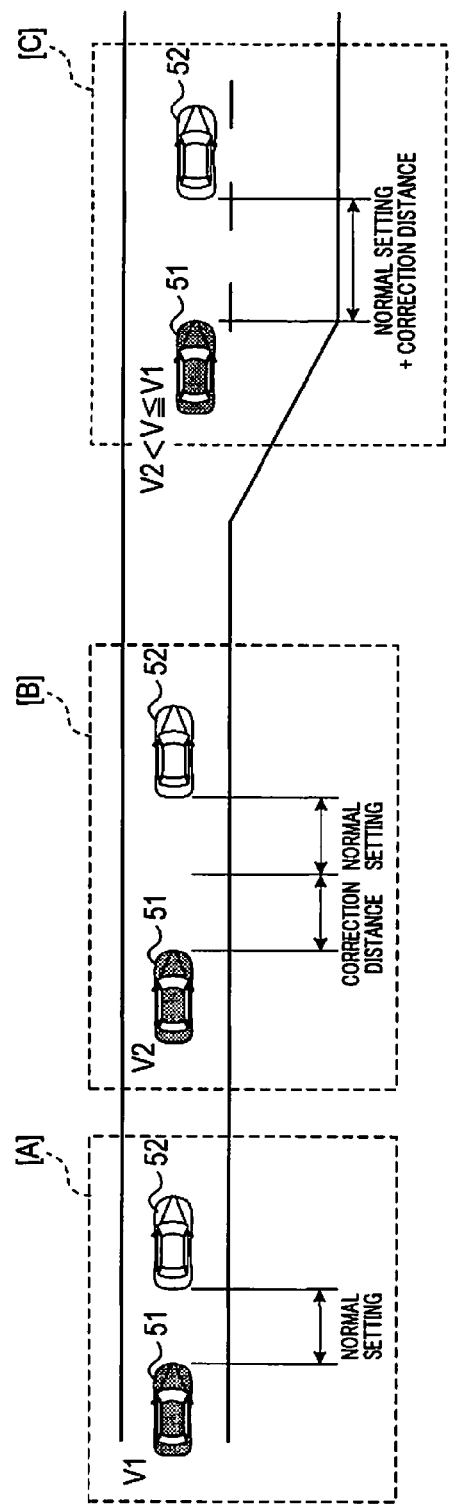
FIG. 5 is a planar view showing changes in inter-vehicle distance setting.

When the target inter-vehicle distance and the own vehicle target acceleration are set in this way, as shown in the broken-line box [C] in FIG. 5, the inter-vehicle distance gradually shortens based on the target acceleration, with the normal target inter-vehicle distance as the lower limit value. In other words, acceleration for passing is started before the own vehicle enters the passing possible zone. The upper limit value of the travelling speed of the own vehicle at this time is the preset vehicle speed that has been set in advance.

Next, the processing unit 10 determines whether or not the own vehicle position is within the passing possible zone (step S340). In this process, the processing unit 10 determines whether or not the own vehicle has entered the passing possible zone to which the distance L corresponds. When determined that the own vehicle position is not within the passing possible zone (NO at step S340), the processing unit 10 terminates the driving assistance process. When determined that the own vehicle position is within the passing possible zone (YES at step S340), the processing unit 10 determines whether or not passing will be completed within the passing possible zone (step S350).

In this process, for example, the processing unit 10 compares a value obtained by dividing the distance X2 from the own vehicle position to the end position of the passing possible zone into which the own vehicle enters by the own vehicle preset speed V1, to a value obtained by dividing a value obtained by subtracting the inter-vehicle distance to the preceding vehicle from the distance X2 by the preceding vehicle speed V2. Then, when determined that the value obtained by dividing the distance X2 to the end position of the passing possible zone by the own vehicle preset speed V1 is less than the value obtained by dividing the value obtained by subtracting the inter-vehicle distance to the preceding vehicle from the distance X2 by the preceding vehicle speed V2, the processing unit 10 determines that passing will be completed within the passing possible zone.

When determined that passing will be completed within the passing possible zone (YES at step S350), the processing unit 10 performs an operation to change the travelling lane and perform passing (step S360). In this process, the processing unit 10 instructs the behavior control unit 26 to pass the preceding vehicle and return to the original lane. The behavior control unit 26 that has received the instruction then controls the own vehicle. When a process such as this is completed, the processing unit 10 terminates the driving assistance process.

When determined that passing will not be completed within the passing possible zone (NO at step S350), the processing unit 10 cancels the preparation for passing (step S370) and terminates the driving assistance process.

[Effects]

In the vehicle control apparatus 1 described in detail above, the processing unit 10 acquires passing suitability information that indicates whether or not the own vehicle is able to pass the preceding vehicle. When determined that the own vehicle is not able to pass the preceding vehicle, an inter-vehicle distance correction means corrects the inter-vehicle distance by adding the correction distance to a reference distance.

In the vehicle control apparatus 1 such as this, when the own vehicle is not able to pass the preceding vehicle, an inter-vehicle distance for acceleration is secured. Therefore, when passing becomes possible, passing can be smoothly performed.

In addition, in the above-described vehicle control apparatus 1, the processing unit 10 acquires passing preparation information indicating at least either of the following: first passing preparation information showing that the driver intends to perform passing; and second passing preparation information showing that the distance or arrival time to a passing possible zone is less than a reference value. The processing unit 10 corrects the inter-vehicle distance only when the own vehicle is not able to pass the preceding vehicle and the passing preparation information has been acquired.

In the vehicle control apparatus 1 such as this, the inter-vehicle distance is corrected only when the passing preparation information is acquired. Therefore, the inter-vehicle distance can be maintained at the reference distance when the passing preparation information is not acquired.

In addition, in the above-described vehicle control apparatus 1, the processing unit 10 acquires the travelling speed of the preceding vehicle and sets the reference distance to be longer as the preceding vehicle speed increases.

In the vehicle control apparatus 1 such as this, because a longer reference distance is set as the preceding vehicle speed increases, a safe inter-vehicle distance based on speed can be ensured. In addition, the distance that is the result of the correction distance being added to the reference distance increases as the speed increases. Therefore, the inter-vehicle distance for acceleration when passing is performed can also be ensured.

In addition, in the above-described vehicle control apparatus 1, the processing unit 10 acquires state transition information that indicates that the own vehicle has transitioned from not being able to pass the preceding vehicle to being able to pass the preceding vehicle, or the own vehicle will transition to being able to pass the preceding vehicle in the near future. When the state transition information is acquired, the processing unit 10 corrects the inter-vehicle distance so as to become the reference distance.

In the vehicle control apparatus 1 such as this, in a situation in which the own vehicle transitions to being able to perform passing, shortening of the inter-vehicle distance can be permitted. Therefore, passing can be facilitated.

In addition, in the above-described vehicle control apparatus 1, the processing unit 10 performs output (control) to accelerate the own vehicle when the state transition information is acquired.

In the vehicle control apparatus 1 such as this, the own vehicle can be accelerated before the inter-vehicle distance becomes the reference distance. Therefore, when the own vehicle changes lanes in this state, passing can be smoothly performed.

In addition, in the above-described vehicle control apparatus 1, when accelerating the own vehicle, the processing unit 10 accelerates the own vehicle such that a preset speed that is set in advance is an upper limit.

In the vehicle control apparatus 1 such as this, a situation in which the own vehicle is accelerated to a speed unintended by the driver can be suppressed.

In addition, in the above-described vehicle control apparatus 1, the processing unit 10 acquires information on the travelling speeds of the own vehicle and the preceding vehicle, and information on the length of a zone in which the own vehicle is able to pass the preceding vehicle. The processing unit 10 then determines whether or not the own vehicle can pass the preceding vehicle within the zone in which the own vehicle is able to the pass the preceding vehicle, using the travelling speeds of the own vehicle and the preceding vehicle, as well as the length of the zone. Then, when determined that the own vehicle cannot pass the preceding vehicle within the zone in which the own vehicle is able to pass the preceding vehicle, the processing unit 10 prohibits output for accelerating the own vehicle.

In the vehicle control apparatus 1 such as this, a situation in which unnecessary acceleration is performed when it is expected that the vehicle cannot pass the preceding vehicle can be suppressed.

In addition, in the above-described vehicle control apparatus 1, the processing unit 10 notifies the user of correction when a correction in which the correction distance is added to the reference distance is performed.

In the vehicle control apparatus 1 such as this, the driver can be made to recognize that the inter-vehicle distance has been changed to an inter-vehicle distance to which the correction distance has been added.

In the processes performed by the processing unit 10 according to the above-described embodiment, the processes at steps S110, S130, and S240 correspond to preparation information acquisition means of the present disclosure. The process at step S120 corresponds to preceding vehicle speed acquisition means of the present disclosure. The process at step S130 corresponds to passing length information acquisition means of the present disclosure. The processes at steps S130 and S230 correspond to passing suitability information acquisition means of the present disclosure.

Furthermore, the processes at steps S130 and S320 correspond to state transition information acquisition means of the present disclosure. The process at step S270 corresponds to notification means of the present disclosure. In addition, the process at step S310 corresponds to inter-vehicle distance correction means of the present disclosure. The process at step S310 corresponds to reference distance setting means of the present disclosure.

Furthermore, the processes at steps S330 and S360 correspond to acceleration output means of the present disclosure. The process at step S350 corresponds to passing suitability determination means of the present disclosure. In addition, the process at step S370 corresponds to output prohibition means of the present disclosure.

Other Embodiments

The interpretation of the present disclosure is not limited in any way by the above-described embodiment. In addition, an embodiment in which a part of the configuration according to the above-described embodiment is omitted within an extent that the problem can be solved is also an embodiment of the present disclosure. In addition, an embodiment in which the above-described embodiments are combined as appropriate is also an embodiment of the present disclosure. Furthermore, any embodiment that can be conceived without departing from the essence of the disclosure specified solely by the expressions recited in the claims is also an embodiment of the present disclosure.

For example, according to the above-described embodiment, the vehicle control apparatus 1 is described as performing automatic steering. However, ACC may be configured such that steering is not controlled. In this case, in the process at step S360, a notification to prompt the driver to perform passing can be given instead of the operation for performing passing.

What is claimed is:

1. A vehicle control apparatus that is mounted to an own vehicle and controls the own vehicle such that an inter-vehicle distance between a preceding vehicle and the own vehicle becomes a reference distance, the vehicle control apparatus comprising:
    passing suitability information acquisition means that acquires passing suitability information indicating whether or not the own vehicle is able to pass the preceding vehicle; and
    inter-vehicle distance correction means that when a travelling position of the own vehicle is in a passing not-possible area in which the own vehicle is not able to pass the preceding vehicle and a distance from the travelling position in the passing not-possible area to a passing possible zone in which passing becomes possible is a predetermined reference value or less, corrects the inter-vehicle distance by adding a correction distance to a reference distance.

2. The vehicle control apparatus according to claim 1, further comprising:
    preparation information acquisition means that acquires passing preparation information indicating at least one of: first passing preparation information showing that a driver intends to perform passing; and second passing preparation information showing that a distance or arrival time to a passing possible zone is less than a predetermined reference value, wherein
    the inter-vehicle distance correction means corrects the inter-vehicle distance when the own vehicle is not able to pass the preceding vehicle and when the passing preparation information is acquired.

3. The vehicle control apparatus according to claim 2, further comprising:
    preceding vehicle speed acquisition means that acquires a speed of the preceding vehicle; and
    reference distance setting means that sets the reference distance to be longer as the speed of the preceding vehicle increases.

4. The vehicle control apparatus according to claim 3, further comprising:
    state transition information acquisition means that acquires state transition information indicating that the own vehicle has transitioned from not being able to pass the preceding vehicle to being able to pass the preceding vehicle, or the own vehicle will transition to being able to pass the preceding vehicle, wherein
    the inter-vehicle distance correction means corrects the inter-vehicle distance by subtraction of the correction distance when the state transition information is acquired.

5. The vehicle control apparatus according to claim 4, further comprising:
    acceleration output means that performs control to accelerate the own vehicle when the state transition information is acquired.

6. The vehicle control apparatus according to claim 5, wherein:
    the acceleration output means performs control to accelerate the own vehicle such that a preset speed is used as an upper limit.

7. The vehicle control apparatus according to claim 5, further comprising:
    passing length information acquisition means that acquires information on a speed of the own vehicle, information on a speed the preceding vehicle, and information on a length of a zone in which the own vehicle is able to pass the preceding vehicle;
    passing suitability determination means that determines whether or not the own vehicle can pass the preceding vehicle within the zone in which the own vehicle is able to the pass the preceding vehicle, based on the speed of the own vehicle, the speed of the preceding vehicle, and the length of the zone; and
    output prohibition means that prohibits output to accelerate the own vehicle when determined that the own vehicle cannot pass the preceding vehicle within the zone in which the own vehicle is able to pass the preceding vehicle.

8. The vehicle control apparatus according to claim 6, further comprising:
    passing length information acquisition means that acquires information on a speed of the own vehicle, information on a speed the preceding vehicle, and information on a length of a zone in which the own vehicle is able to pass the preceding vehicle;
    passing suitability determination means that determines whether or not the own vehicle can pass the preceding vehicle within the zone in which the own vehicle is able to the pass the preceding vehicle, based on the speed of the own vehicle, the speed of the preceding vehicle, and the length of the zone; and
    output prohibition means that prohibits output to accelerate the own vehicle when determined that the own vehicle cannot pass the preceding vehicle within the zone in which the own vehicle is able to pass the preceding vehicle.

9. The vehicle control apparatus according to claim 8, further comprising:
    notification means that when a correction in which the correction distance is added to the reference distance is performed, notifies a user of information showing that the correction is performed.

10. The vehicle control apparatus according to claim 1, further comprising:
  preceding vehicle speed acquisition means that acquires a speed of the preceding vehicle; and
  reference distance setting means that sets the reference distance to be longer as the speed of the preceding vehicle increases.

11. The vehicle control apparatus according to claim 1, further comprising:
  state transition information acquisition means that acquires state transition information indicating that the own vehicle has transitioned from not being able to pass the preceding vehicle to being able to pass the preceding vehicle, or the own vehicle will transition to being able to pass the preceding vehicle, wherein
  the inter-vehicle distance correction means corrects the inter-vehicle distance by subtraction of the correction distance when the state transition information is acquired.

12. The vehicle control apparatus according to claim 11, further comprising:
  acceleration output means that performs control to accelerate the own vehicle when the state transition information is acquired.

13. The vehicle control apparatus according to claim 12, wherein:
  the acceleration output means performs control to accelerate the own vehicle such that a preset speed is an upper limit.

14. The vehicle control apparatus according to claim 1, further comprising:
  notification means that when a correction in which the correction distance is added to the reference distance is performed, notifies a user of information showing that the correction is performed.

15. A non-transitory computer-readable storage medium storing a vehicle control program for enabling a computer to function as a vehicle control apparatus that is mounted to an own vehicle and controls the own vehicle such that an inter-vehicle distance between a preceding vehicle and the own vehicle becomes a reference distance, the vehicle control apparatus comprising:
  passing suitability information acquisition means that acquires passing suitability information indicating whether or not the own vehicle is able to pass the preceding vehicle; and
  inter-vehicle distance correction means that when a travelling position of the own vehicle is in a passing not-possible area in which the own vehicle is not able to pass the preceding vehicle and a distance from the travelling position in the passing not-possible area to a passing possible zone in which passing becomes possible is a predetermined reference value or less, corrects the inter-vehicle distance by adding a correction distance to a reference distance.

16. A vehicle control method comprising:
  acquiring, by a vehicle control apparatus that is mounted to an own vehicle and controls the own vehicle such that an inter-vehicle distance between a preceding vehicle and the own vehicle becomes a reference distance, passing suitability information indicating whether or not the own vehicle is able to pass the preceding vehicle; and
  correcting, by the vehicle control apparatus, the inter-vehicle distance by adding a correction distance to a reference distance when a travelling position of the own vehicle is in a passing not-possible area in which the own vehicle is not able to pass the preceding vehicle and a distance from the travelling position in the passing not-possible area to a passing possible zone in which passing becomes possible is a predetermined reference value or less.

* * * * *